SIMULTANEOUSLY MULTI-MODE OSCILLATOR SYSTEM

Filed July 9, 1964

INVENTOR
PAGE G. BROWN

BY Nilsson, Robbins & Anderson
ATTORNEYS 3,274,588
SIMULTANEOUSLY MULTI-MODE OSCILLATOR SYSTEM Page G. Brown, 1158 W. 54th St., Los Angeles, Calif.
Filed July 9, 1964, Ser. No. 381,444
5 Claims. (Cl. 340—384)

Figures 1, 2:
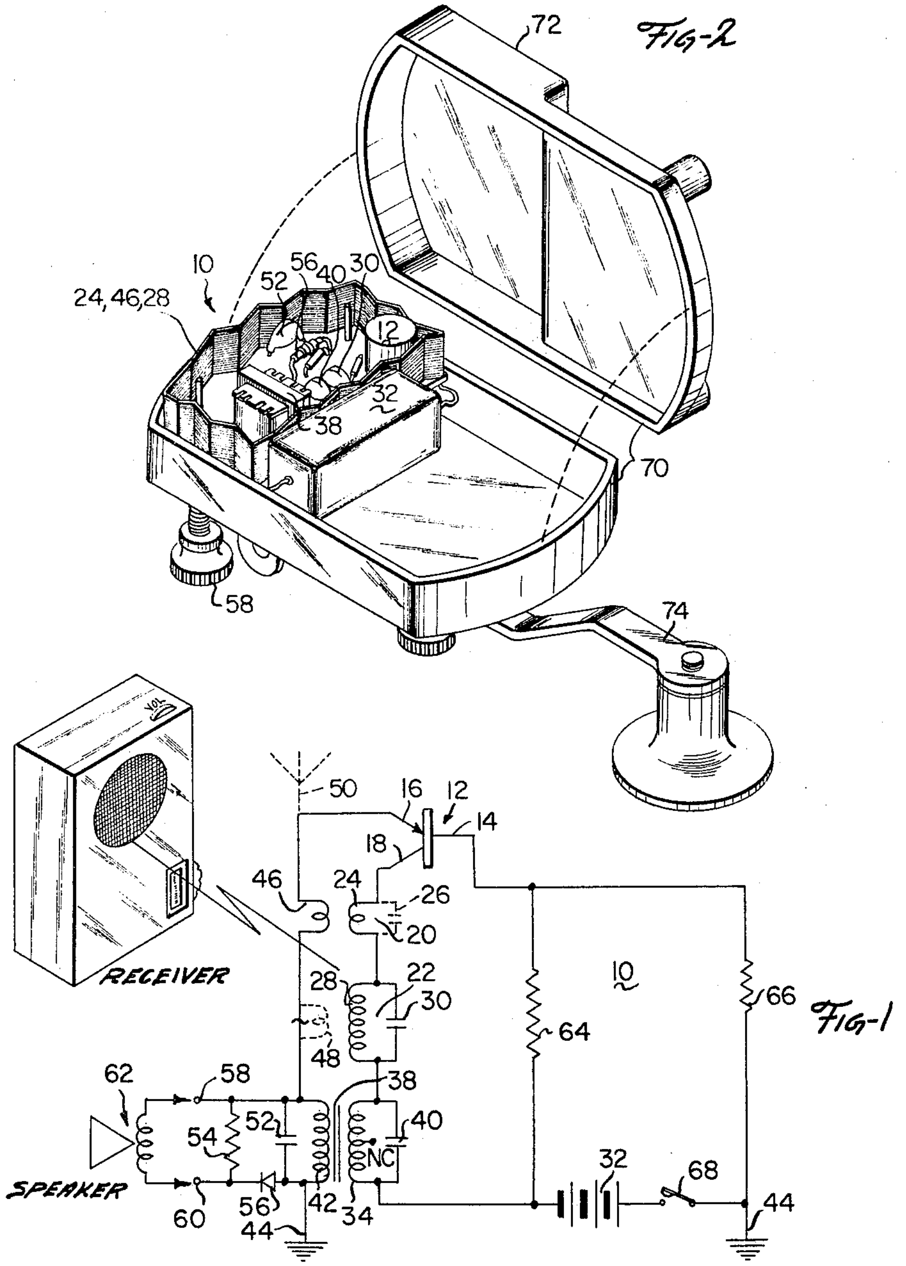

This invention relates generally to electrical signal oscillators and more particularly to a unitary network which radiates or otherwise provides simultaneously a plurality of electrical signals, each having a different predetermined frequency.

There is a recognized need for a compact and efficient such network in a number of different electronic fields. For example, in radio operators' schools or where persons are learning and practicing Morse code, there has not heretofore been available a truly compact and unitary practice oscillator and keyer which provides an audio frequency signal for direct connection to any available speaker as well as a radio frequency signal for remote pickup by any broadcast receiver without direct connection thereto.

Another field with a similarly non-fulfilled need is that of the electronics technician who has not heretofore had available a compact device which supplies the plurality of signals required for systematic trouble shooting, as by signal tracing, without requiring relatively massive signal generators which typically are alternating current energized, and are not therefore, truly portable for use in the field. Furthermore, such signal generators generally require switching and, often, subsequent adjustment, when a different output frequency is desired.

Still another example of a field in which such a need exists is that of survival equipment and related subsequent rescue operations. Attempts in the past to provide compact self-contained beacon or distress transmitters have typically been directed toward the development of single-frequency oscillators which in some cases, are modulated by an audio distress signal. A shortcoming of such transmitters is that the single radio frequency output has a relatively small probability of detection because of the small frequency space it occupies on the radio spectrum. Furthermore, when the signal is not modulated the detection is even less probable because the receiver must have an appropriately tuned, beat frequency local oscillator in order for its monitor to obtain an audible signal.

Accordingly, it is an object of the present invention to provide a simultaneously multiple mode oscillator system which is not subject to these and other deficiencies of the prior art.

It is another object to provide such a system which is compact and is self-contained as regards its energizing or keying, its antenna, and its power supply.

It is another object to provide such a system which is pocket-size.

It is another object to provide such a system which may provide simultaneously, an audio signal and a plurality of discrete, predetermined radio frequency signals and in which the audio signal is a keyed, constant tone and said radio frequency signals have frequencies useful in signal tracing in a heterodyne radio receiver.

It is another object to provide such an oscillator network in which the frequencies of said radio signals are preset, and are substantially constant.

It is another object to provide such a system which is relatively simple and exceedingly dependable, both electrically and mechanically.

Briefly, these and other objects of the invention are achieved in one example thereof which includes a single amplifier transistor in whose collector circuit are connected, in this example, a system of resonant tank circuits. The tanks are in series with each other and that nearest the collector electrode is resonant at the highest frequency, for example, 27 megacycles per second, which is in the Citizens Band designed by the Federal Communications Commission (FCC). The second is pretuned to 1250 kilocycles per second, which is in the standard Broadcast Band, and the third tank circuit, most remote from the collector electrode, is tuned to an intermediate frequency (IF) of approximately 455 kilocycles per second. Also associated with the third resonant circuit is an audio oscillator network having a frequency of approximately 2,000 cycles per second.

The inductance for the intermediate frequency signal as well as that for the 2,000 cycle signal, is furnished by the separate windings of a subminiature audio output transformer. The other inductances are formed by more or less conventional radio frequency coils. The collector electrode, through its series of resonant tanks, is returned to the negative terminal of the battery.

Feedback is provided from each of the tank circuits by reactive coupling of the emitter circuit to each of the resonant circuit coils. The emitter circuit consists of a series, in this example, of inductances, each coupled to a respective one of the collector tank circuits and is ultimately returned to the positive side of the battery. An on-off keyer is interconnected in series with the battery for energizing the oscillator as desired.

It should be noted that when the circuit is energized, it oscillates simultaneously in four modes, thusly providing an audio frequency signal, an intermediate frequency signal for signal tracing in super-heterodyne receivers, a medium radio frequency signal in the standard Broadcast Band, and a relatively high frequency signal in the Citizens Band. The resulting circuit and its physical package including the mechanical telegraph key weighs only two to three ounces and the circuit components including the battery, occupy approximately one cubic inch.

Further details of these and other novel features and their operation as well as additional objects and advantages of the invention will become apparent and be best understood from a consideration of the following description taken in connection with the accompanying drawing which is presented by way of an illustrative example only, and in which:

FIG. 1 is a schematic diagram illustrating one example of a simultaneously multiple mode oscillating network constructed in accordance with the principles of the present invention; and FIG. 2 is a perspective view, from below, of a practice keyer example of the invention which embodies the circuit illustrated in FIG. 1.

With specific reference now to the figures in detail, it is stressed that the particulars shown are by way of example and for purposes of illustrative discussion only, and are presented in the cause of providing what is believed to be the most useful and readily understood description of the principles and conceptual aspects of the invention. In this regard, no attempt is made to show structural details of the network in more detail than is necessary for a fundamental understanding of the invention, the description taken with the drawings making apparent to those skilled in the electronics arts how the several forms of the invention may be embodied in practice. Specifically, the detailed showing is not to be taken as a limitation upon the scope of the invention, which is defined by the appended claims forming along with the drawing, a part of this specification.

Referring to FIG. 1, the oscillator network 10 of the present example of the invention comprises an amplifier transistor 12 having a control or base electrode 14, an emitter electrode 16, and a collector electrode 18. A pair of resonant tank circuits 20, 22 are connected in series, with one terminal of the former being connected to the collector electrode 18 of the transistor 12. The inductor 24 of the resonant LC circuit 20 is formed by a few turns of copper wire, while the capacitor 26 shown in shunt with the inductor 24 represents the inherent stray capacitance of the windings thereof. In this example, the resonant frequency of the tank circuit 20 is chosen as 27 megacycles in order to radiate a signal in the FCC designated Citizens Band. The inductor 24 is formed from eight turns of copper wire having a resultant inductance of 1.7 millihenries.

The inductor 28 of the resonant LC tank circuit 22 is formed from forty turns of copper wire with a resultant inductance of 60 millihenries. The shunt capacitor 30 has a capacitance of 250 picofarads. The resultant tank circuit is resonant at a frequency of approximately 1270 kilocycles per second which frequency lies within the standard Broadcast Band.

Intercoupled between the resonant tank circuit 22 and the negative terminal of a battery 32 is the primary winding 34 of a push-pull audio output transformer 38. The centertap of the primary winding 34 is, as shown, not connected and the winding is shunted by a capacitor 40 having, in this example, a capacitance parameter of 100 picofarads.

The secondary or voice-coil winding 42 of the audio transformer 38 is coupled between a common bus 44 designated "ground" in the figure, and the emitter electrode 16 of the transistor 12. Interconnected between the winding 42 and the electrode 16 is a feedback inductor 46 which is coupled by mutual inductance to the inductor 24 of the resonant LC tank circuit 20. In this example the feedback inductor 46 is also wound of eight turns of copper wire having a resultant inductance of 1.7 millihenries. When desired, depending upon the physical form of the inductors and the layout of the circuitry, an additional feedback inductor 48 may be interposed between the inductor 46 and the winding 42 of the audio transformer 38. An inductor 48 when utilized is inductively coupled to the inductor 28 of the resonant tank circuit 22.

Generally, it has been found that the coils of the circuit radiate adequately for most intended purposes; however, when maximum radiating efficiency is desired, an auxiliary antenna 50 may be coupled to the emitter circuit as shown by the dotted antenna configuration in the figure.

A capacitor 52 is connected in shunt across the winding 42 of the audio transformer and, in this example, has a capacitance value of .04 microfarads. With this value, the lowest radio frequency mode of the oscillator network is approximately 455 kilocycles per second and is thereby equivalent to one of the universally accepted frequencies used as the IF for super-heterodyne receivers.

A load resistor 54 connected in series with a diode 56 is also coupled across the terminals of the winding 42 of the output transformer. The value of the load resistor 54 may be approximately 10 ohms and is connected at its opposite ends to a pair of output terminals 58, 60, which may be connected to an external speaker 62 or, as desired, to any external audio equipment including, e.g., earphones, public address systems, recorders, transmitters, etc. When the external equipment is utilized and is an audio transducer such as a permanent magnet-type speaker, it is desirable to attenuate the bucking voltage generated by the voice coil on its return swing. This blocking of the back E.M.F. is achieved in this example, with the diode 56. Furthermore, in this same regard, the load resistor 54 serves to minimize the effect of connecting or disconnecting the external speaker 62 to the terminals 58, 60. But for the load resistor 54 being connected across the output terminals, the connecting and disconnecting of the external speaker may cause a corresponding load variation of approximately 3.5 ohms to 0 ohm. This much variation can, in some cases, affect the frequencies of the different modes of the network which in turn may alter the bias and cause undue distortion and decreased efficiency in the amplifier.

The quiescent bias voltage for the control electrode 14 of the transistor amplifier is provided by a voltage divider resistor network which is connected between the negative terminal of the battery 32 and the common bus 44, and which includes a resistor 64 and resistor 66. In this example the transistor 12 is a type DS 41; and with a battery voltage of 6 volts, the resistor 64 may have a value of 2.2 kilohms while the resistor 66 is approximately 120 ohms.

Interconnected between the positive terminal of the battery 32 and the common bus 44 is, in this example, the telegraphic keyer switch 68. For this example the contacts of the switch 68 constitute a normally open, momentary contact switch which, when the key is depressed, energizes the circuit and causes the output of the radio frequencies above described as well as an audio signal of approximately 2000 cycles. This signal frequency, it may be noted, is provided across the load resistor 54 whether or not the external speaker 62 is connected to the network.

In operation each frequency is modulated by the next lower frequency which in turn governs the bandwidth of the higher frequency output. This effect, of course, determines, to a relatively large degree, the choice and number of radiating frequencies chosen. This choice, determined by design of the various resonant circuits, may be of the various emergency frequencies and of units normally carried in lifesaving gear and kits.

With the modulated signals radiated by the network 10, it should be noted that operators of a simple receiver can readily recognize an SOS signal and trace its source with a relatively high magnitude of probability of detection. Furthermore, because the signals are modulated by the 2000 cycle audio signal, the radio frequency output of the unit may be detected by any radio receiver whether or not it has a properly tuned beat frequency oscillator, and whether or not the receiver is a Broadcast Band or a Citizens Band unit.

The advantages of the pocket-sized unit whose electrical components including the battery 32 require less than approximately one cubic inch, are apparent for electronics repairmen who may readily carry such a unit in a shirt pocket. The unit may be used to insert signals into electronic equipment by affixing a lead to the emitter electrode 16, for example, for purposes of determining by conventional signal tracing techniques, where the signal stops in inoperative equipment. The example of the invention heretofore illustrated and discussed is particularly useful for trouble-shooting in Broadcast Band super-heterodyne receivers; however, other type units have been designed within the scope of the invention to produce signals appropriate for television repair work. Such a television tester has, for example, a two kilocycle audio output, a 4.5 megacycle output for sound intermediate frequency strips, 44 megacycles for video intermediate frequency strips, and 100 megacycles for the radio frequency or front-end of television units.

It may be useful to note in connection with the circuitry associated with the audio output transformer 38, that the audio frequency is determined by the particular audio transformer and diode chosen as well as by the capacitors 40, 52 and the resistor 54; while the low radio frequency or IF is determined by the secondary winding, winding 42, of the transformer 38 in cooperation with the capacitor 52 and the capacitor 40.

The Broadcast Band radio frequency is determined primarily by the effective values of the coil 28 and capacitor 30 while the Citizens Band radio frequency is determined by the inductance of the coil 24 and its stray capacitance.

Since all the resonant circuits are in a series, a change in the parameters of one of the higher frequency circuits will affect one and all of the lower frequencies in, however, lesser degrees. In this regard it may be noted that 50 picofarads across the coil 24 alters the frequency to approximately 15 megacycles instead of 27, and alters the Citizens Band output by approximately 100 kilocycles. 330 picofarads across the coil 24 causes the high frequency output to be approximately 7.5 megacycles.

In some of the constructed examples of the invention, coils 24 and 28 are incorporated in a single coil, in which case the emitter or feedback winding, inductor 46, serves both the high and the medium radio frequencies. When the coils 24 and 28 are individual components of various forms, for example scramble wound or layered, it is sometimes necessary to incorporate a small amount of feed back for these coils with the emitter winding 48.

Referring to FIG. 2, an example of the physical layout for the oscillator network 10 and its packaging for a code practicing unit, is illustrated in a perspective form. A housing 70 is provided the overall length of which is approximately 2½ inches and which has an increased height portion 72 within which the electrical components of the network 10 are disposed. The entire volume of the components of the network including the battery 32, the transistor 12, the audio transformer 38, the composite winding of the coils 24, 46, 28, as well as the smaller components including the capacitors 30, 40, 52 and the diode 56, is less than approximately one cubic inch.

In FIG. 2 one of the output terminals 58 as well as the arm 74 of the keyer is illustrated in the practice coder or distress signal transmitter of this particular example of the invention. It is to be understood, of course, that the package could be much smaller if an alternative type of momentary contact switch were utilized in place of the telegraphic keyer embodiment of the switch 68.

There has thus been disclosed and described an example of a simultaneously multiple mode oscillating and transmitting system which achieves the objects and exhibits the advantages set forth hereinabove.

What is claimed is:

1. Multiple-mode oscillator circuit comprising:

an amplifier transistor having emitter, collector and control electrodes;

a battery having positive and negative terminals;

a common bus;

an audio output transformer having primary and secondary windings;

a pair of audio output terminals;

a first radio frequency coil resonant with its stray shunt capacitance to a first radio frequency and being coupled to said collector electrode;

a second radio frequency coil and shunt capacitor resonant to a second radio frequency and being coupled in series with said first radio frequency coil, said first radio frequency being higher than said second radio frequency, and said first and second radio frequencies being non-harmonically related, said primary winding of said audio frequency output transformer being intercoupled in series between said second radio frequency coil and said negative terminal of said battery, and said secondary winding of said audio transformer being coupled between said emitter electrode and said common bus;

a diode and load resistor coupled in series across the terminals of said secondary winding of said audio transformer, said pair of output terminals being connected respectively to opposite ends of said load resistor;

a voltage divider resistor network coupled between said positive and negative terminals of said battery with said control electrode of said transistor being connected to said network;

means for coupling said positive terminal of said battery to said common bus and feedback means interconnected between said emitter electrode and said secondary winding of said audio transformer and coupled to each of said first and second radio frequency coils.

2. The invention according to claim 1 in which said feedback means comprises at least one radio frequency coil coupled to the said emitter electrode.

3. The invention according to claim 1 in which said feedback means includes at least one radio frequency coil coupled to said emitter electrode and inductively coupled to each of said first and second radio frequency coils, and which further includes:

a first capacitor coupled across said primary winding of said audio transformer;

a second capacitor coupled across said secondary winding of said audio transformer;

and a speaker having a pair of terminals with respective ones thereof coupled to respective ones of said pair of audio output terminals.

4. The invention according to claim 1 which further includes a first capacitor coupled across said primary winding of said audio transformer and a second capacitor coupled across said secondary winding of said transformer and in which the resonant frequency associated with the effective electrical reactance parameters of said secondary winding and said first and second capacitors is of the order of 455 kilocycles per second.

5. The invention according to claim 4 in which said first radio frequency which is the resonant frequency associated with the effective electrical reactance parameters of said first radio frequency coil and stray shunt capacitance is in the range of the FCC Citizens Band, while said second radio frequency which is the resonant frequency associated with the effective electrical reactance parameters of said second radio frequency coil and shunt capacitor is in the range of the standard Broadcast Band.

References Cited by the Examiner

UNITED STATES PATENTS

| | | | |
|---|---|---|---|
| 1,860,050 | 5/1932 | Osnos | 331—60 |
| 2,820,144 | 1/1958 | Hermes | 331—60 |
| 2,910,689 | 10/1959 | Grace | 331—108 |
| 3,137,846 | 6/1964 | Keeling | 340—384 |

FOREIGN PATENTS

| | | |
|---|---|---|
| 221,741 | 5/1959 | Australia. |

ROY LAKE, *Primary Examiner.*

J. KOMINSKI, *Assistant Examiner.*